3,062,790
ALLYL METHACRYLATE MODIFIED HIGH FLEXURAL STRENGTH COPOLYMERS AND METHOD OF PREPARING THE SAME

Charles H. Schramm and Carl B. Miller, Easton, Pa., assignors to J. T. Baker Chemical Company, Phillipsburg, N.J., a corporation of New Jersey
No Drawing. Filed Nov. 5, 1959, Ser. No. 851,005
1 Claim. (Cl. 260—80.5)

This invention relates to new polymers, to processes of preparing the same and to products formed from such new polymeric materials.

In United States Patent No. 2,220,033, issued October 29, 1940, to Bauer et al., interpolymers of acrylic nitrile, methyl methacrylate and methacrylic amides are described which have excellent tensile strength and impact strength as well as other desirable properties. These terpolymers have been found highly useful for the fabrication of articles such as arch supports which require material which is light in weight, yet which is tough and has good impact, and flexural strength.

It has now been found that terpolymers of acrylonitrile, methyl methacrylate and methacrylamide can be further improved, particularly in flexural strength by incorporating therein small amounts of allyl methacrylate. Increase in flexural strength is of extreme importance in articles such as arch supports which are constantly being flexed. Other articles which require high flexural strength characteristics may also be formed from the new polymer by conventional methods of fabrication.

The new polymers of the present invention have still further advantages which increase their utility in the fabrication of many articles. For instance, cast sheets of the new polymers of the present invention can be readily shaped at relatively low temperatures, i.e. about 100° C.

Sheets of prior art terpolymers of the type mentioned above require heating to a temperature of about 140° C. before they can be softened sufficiently to be shaped to a desired contour. These new polymers also have excellent elastic memory and return to their original shape after prolonged high deformations.

The new polymers of the present invention are formed from 50 to 80 parts by weight of acrylonitrile, 20 to 45 parts by weight of methylmethacrylate and 1 to 10 parts by weight of methacrylamide and are modified by 0.1% to 2% on the basis of the above mixture with allyl methacrylate which imparts the unusually high flexural strength to these new polymers.

To illustrate some of the advantages obtained by the addition of small amounts of allyl methacrylate to the composition, a polymer was prepared from the following mixture.

63 parts acrylonitrile
32 parts methyl methacrylate
5 parts methacrylamide
0.05 percent 2,2-azo-bis-butyronitrile
0.5 percent allyl methacrylate This mixture was refluxed for two hours under nitrogen until it was of a syrupy consistency and then poured into a mold. The mold was placed in an oven at 65 to 70° for two hours and then heated through the following cycle:

75° C. for 20 hours
95° C. for 22 hours
110° C. for 8 hours

The physical properties of the straw colored transparent sheet obtained at the end of this time were as follows:

Tensile strength, p.s.i. _____ 11,450
Flexural strength, p.s.i. _____ 26,300
Izod impact strength, ft. lbs./in. notch _____ 0.48

The tensile and impact strength of the plastic were comparable with a commercially available copolymer having similar proportions of acrylonitrile, methyl methacrylate, and methacrylamide, but the material was found to have superior flexural strength. This is a very important factor when considering this material for use in arch supports and other articles requiring high flexural strength.

It has also been found that the temperatures involved in the polymerization cycle are important factors in determining the properties of the polymer. An increase in the final curing temperature noticeably increases tensile and flexural strength. This will be noted in the following table.

| Properties | Curing Temperature Limit | |
| --- | --- | --- |
|  | 90° C. | 110° C. |
| Flexural, p.s.i. | 17,200 | 26,300 |
| Tensile, p.s.i. | 7,800 | 11,450 |
| Impact ft. lbs./in. notch | 0.475 | 0.475 |

In view of these results we prefer that the preliminary polymerization to obtain a castable syrup be within the range 50 to 70° C. for the period 1 to 6 hours and that the resin be cured after casting at from 15 hours to 30 hours at temperatures ranging from 70 to 90° C., and then 15 hours to 30 hours being within the range 90° C. to 120° C.

The polymerization catalyst may be any of the free radical producing catalysts which are known and used by those skilled in the art in the preparation of polymeric materials of the kind under discussion. These include, for example, organic peroxides such as benzoyl peroxide, lauryl peroxide, tertiary butyl peroxide, cumic hydroperoxide, diazotates such as azoisobutyronitrile, persulfates such as potassium persulfate, oximides, metal alkyls, hydrazines, amine oxides and the like. These free radical-generating catalysts may be used in the amounts ranging from 0.01 to 0.8 percent by weight based on the total monomers used.

The invention will be further illustrated by a specific example showing a preferred method of preparing a highly desirable product, which is particularly useful because of its high flexural strength.

Example I

A mixture composed of 63 parts by weight of acrylonitrile, 32 parts methyl methacrylate, 5 parts methacrylamide, 0.05 percent 2,2'-azo-bis-isobutyronitrile was charged to a three-neck flask fitted with a stirrer, reflux condenser and nitrogen supply. The reaction was refluxed for two hours under nitrogen plates. At this point the allyl methacrylate was added and the syrup was cast into molds consisting of two polished glass plates spaced one-eighth inch apart. The molds were placed in an oven at 65 to 70° C. for two hours at which point a slight turbidity appeared in the sheet. At this point the gasket is stripped from the mold since now the syrup can support the mold plates and no flow or "creep" of syrup is observed. This makes it possible for the mold plates to follow the shrinkage of the syrup as it polymerizes further, without forming voids or bubbles in the sheet. The polymerization cycle is then continued as follows:

75° C. for 22 hours
95° C. for 20 hours
110° C. for 8 hours

It will be understood, of course, that dyes, pigments, plasticizers and other modifying agents may be added as desired to obtain specific effects desired by those working with the material. The new polymers may be machined, cut, drilled, shaped, and fabricated by the usual techniques used in the art when working with other thermosetting plastic materials.

To prepare arch supports for instance, the material is cast into thin sheets as described above of about 1 to 10 mm. in thickness. The cold material may then be cut with a band saw to a desired shape and then smoothed with fine abrasives to eliminate sharp edges and nicks on the surface which might serve as the starting point of a fracture. The material is then warmed to approximately 100° C. as by immersion in boiling water and then formed into the desired shape by molding with dies or against a plaster impression taken from the arch of a person for whom the arch support is intended. After cooling to about 50° C. the material can be removed from the form, and it thereafter holds its shape until heated again to 100° C. for correction if necessary.

We claim:

A process of preparing a copolymer of high flexural strength which comprises heating at reflux temperature for about two hours under an oxygen-free atmosphere 63 parts by weight of acrylonitrile, 32 parts by weight of methyl methacrylate, 5 parts by weight of methacrylamide, 0.5% by weight of 2,2-azo-bis-butyronitrile, and 0.5% by weight of allyl methacrylate, said percentages being based upon the weight of said acrylonitrile, methyl methacrylate and methacrylamide in said reaction mixture, pouring the resulting syrupy copolymer into a mold and thereafter curing the material at a temperature of approximately 75° C. for 20 hours, then at 95° C. for 22 hours and thereafter at 110° C. for 8 hours.

References Cited in the file of this patent

UNITED STATES PATENTS

| | | |
|---|---|---|
| 2,189,734 | Kistler | Feb. 6, 1940 |
| 2,220,033 | Bauer et al. | Oct. 29, 1940 |